Oct. 19, 1965     W. J. CRAIG ETAL     3,212,129
BLOW MOLDING MACHINE
Filed Aug. 27, 1962     11 Sheets-Sheet 6

INVENTORS
WALTER J. CRAIG
DEAN B. CHENOWETH
THOMAS L. SCHUETTE
KENNETH M. WAHLGREN
BY
Moore, White & Reed
ATTORNEYS

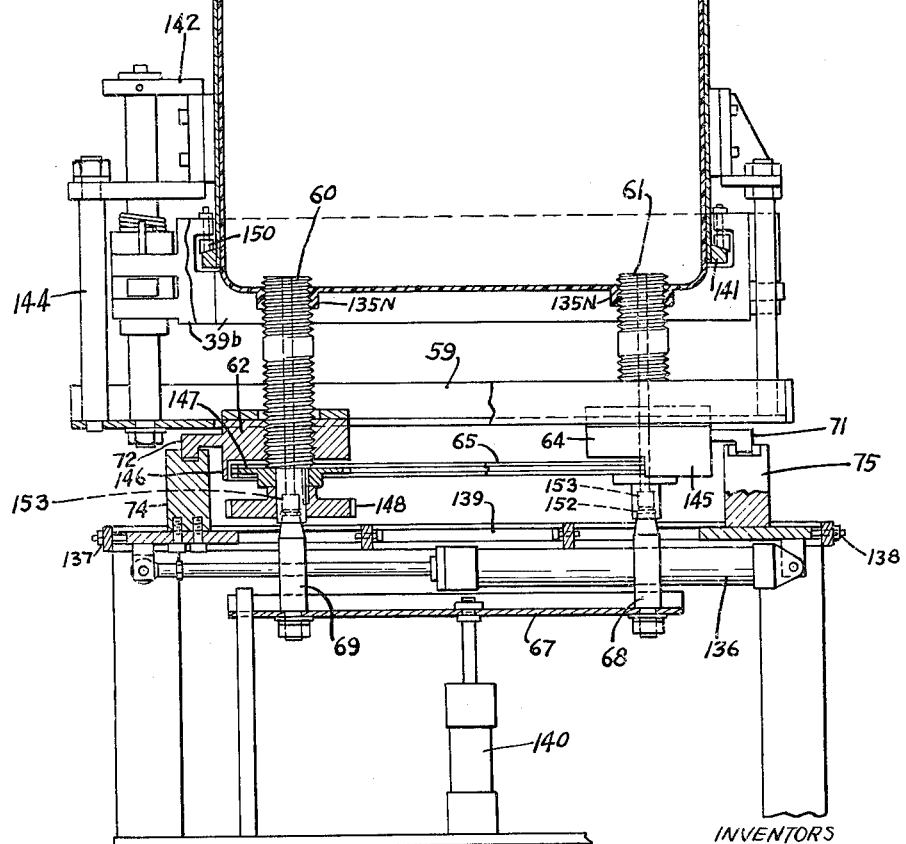

INVENTORS
WALTER J. CRAIG
DEAN B. CHENOWETH
THOMAS L. SCHUETTE
KENNETH M. WAHLGREN
BY Moore, White & Burd
ATTORNEYS Oct. 19, 1965  W. J. CRAIG ETAL  3,212,129
BLOW MOLDING MACHINE
Filed Aug. 27, 1962  11 Sheets-Sheet 9

INVENTORS
WALTER J. CRAIG
DEAN B. CHENOWETH
THOMAS L. SCHUETTE
KENNETH M. WAHLGREN

BY Moore, Whiter & Burd
ATTORNEYS

Oct. 19, 1965  W. J. CRAIG ETAL  3,212,129
BLOW MOLDING MACHINE
Filed Aug. 27, 1962  11 Sheets-Sheet 10

INVENTORS
WALTER J. CRAIG
DEAN B. CHENOWETH
THOMAS L. SCHUETTE
KENNETH M. WAHLGREN
BY
Moore, White & Reed
ATTORNEYS

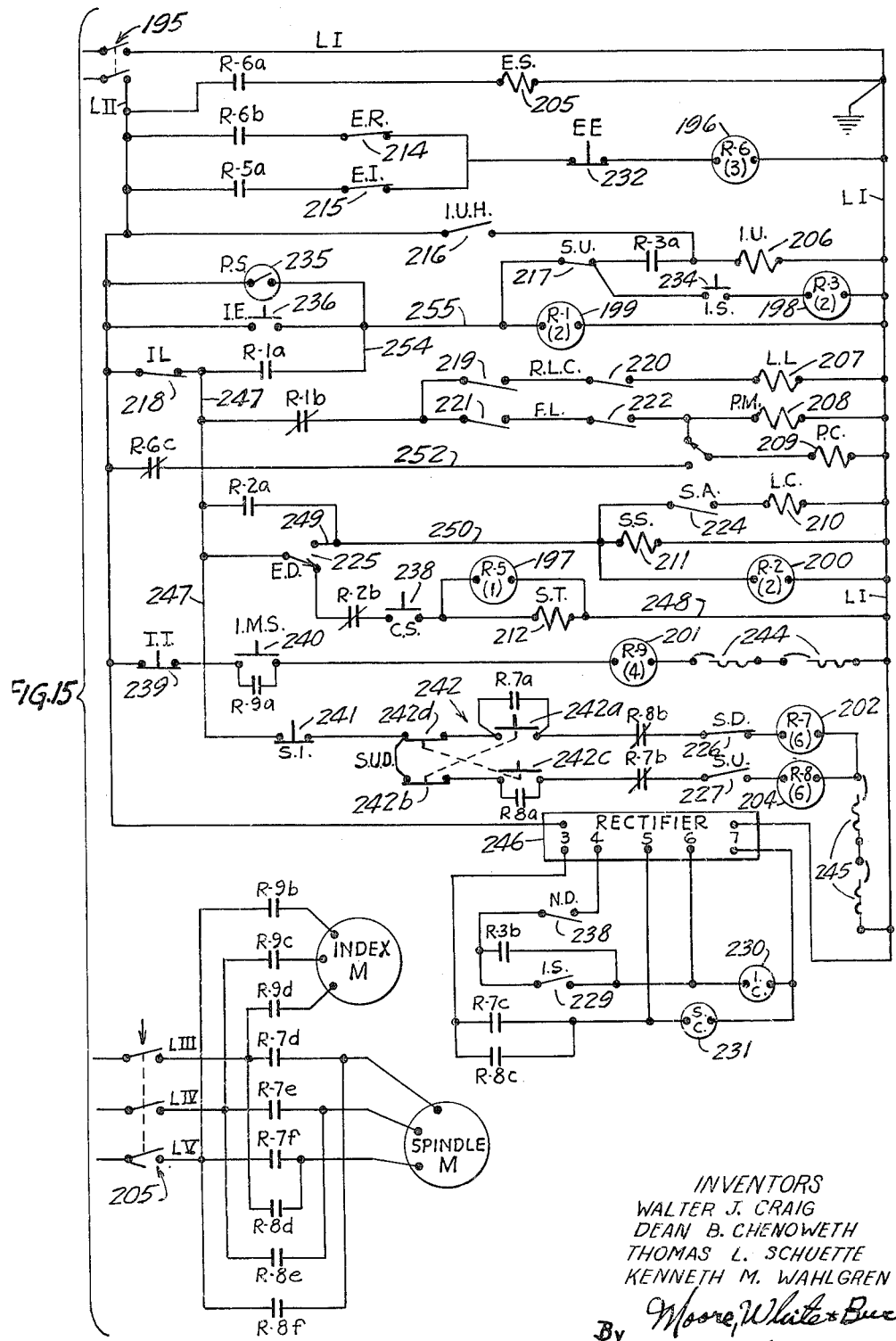

United States Patent Office 3,212,129
Patented Oct. 19, 1965

3,212,129
BLOW MOLDING MACHINE
Walter J. Craig and Dean B. Chenoweth, Minneapolis, Thomas L. Schuette, Mayzata, and Kenneth M. Wahlgren, Forest Lake, Minn., assignors, by direct and mesne assignments, to the Greif Bros. Cooperage Corporation, Delaware, Ohio, a corporation of Delaware
Filed Aug. 27, 1962, Ser. No. 219,464
16 Claims. (Cl. 18—5)

This invention is a molding machine for blowing hollow objects in a confining mold and in which the molds comprise separable portions that are locked together mechanically by structure on the mold. In the preferred form of the invention a sleeve-like hollow central body portion is provided with removable ends. These mechanically locked molds make possible storing the filled molds in whatever quantities and for as long as is necessary to allow the molds to cool without delaying the filling of additional molds.

The structure is further novel in having removable spindles for introducing the molding gas pressure inside the article whereby an off-center location may be provided in an article to be molded in a mold that is concentric with the device placing the molten material inside the mold in preparation for forming the hollow article.

Forming objects by applying fluid pressure inside a pliable raw blank while it is contained within a mold having inside of it the external configuration desired for the molded object is an old art. It is also a rather highly developed and sophisticated art with many variations on the general theme of inserting raw materials into an openable mold which is then closed on the raw materials and the raw materials expanded by fluid pressure to take the shape of the mold. All of these previously known molding machines, however, had a common feature which was the split or divided mold the portions of which were held together in molding position by various means. These split molds require rather substantial forces to hold them in tight association while the blowing process is being carried out. The ponderessness of the equipment for holding the molds in this tight association, particularly when molding large objects, severely limits the speed with which an indexing structure may be moved. Furthermore, the heavy press structure has made it more difficult to cool the molded product and hence extended the time required for cooling to again limit speed of indexing. Most importantly, these prior devices were limited in output, because the size etc., of the presses for holding the molds closed limited the number of molds that could be involved with a single extruder. Accordingly, the output of one of these prior molding machines is relatively retarded, particularly if it is making a large container, and hence the cost of the individual items produced by the machine remains relatively high.

Accordingly, it is a principal object of this invention to provide a novel blow molding machine.

Another object of this invention is to provide a blow molding machine the output of which may equal the capacity of any extruder.

Yet another object of this invention is to provide a mold the parts of which are mechanically locked together by structure that is part of the mold.

It is a further object of this invention to provide a blow molding machine that employs a hollow sleeve for the principal mold retaining structure.

It is yet another object of this invention to provide a blow molding machine in which ends for the mold are provided that engage the sleeve and are held locked to the sleeve by structure that is an integral part of the mold.

It is a still further object of this invention to provide a blow molding machine which may be of relatively light construction.

It is still another object of this invention to provide a blow molding machine in which indexing may be rapid.

Still a further object of this invention is to reduce the time required to cool a mold in which a hollow object has been formed by blow molding.

A still further object of this invention is to provide an indexing type structure in which off-center formations may be made.

Other and further objects of the invention are those inherent and apparent in the apparatus as described, pictured and claimed.

To the accomplishment of the foregoing and related ends, this invention then comprises the features hereinafter fully described and particularly pointed out in the claims, the following description setting forth in detail certain illustrative embodiments of the invention, these being indicative, however, of but a few of the various ways in which the principles of the invention may be employed.

The invention will be described with reference to the drawings in which corresponding numerals refer to the same parts and in which:

FIGURE 7 is a view similar to and drawn to the same scale as FIGURE 6 but showing the gas inserting needles extended and engaging the nozzle portions of the closed mold; broken lines illustrate hidden parts;

FIGURE 15 is a diagrammatic representation of the control circuit for the invention; it is not drawn to scale.

Figure 1:
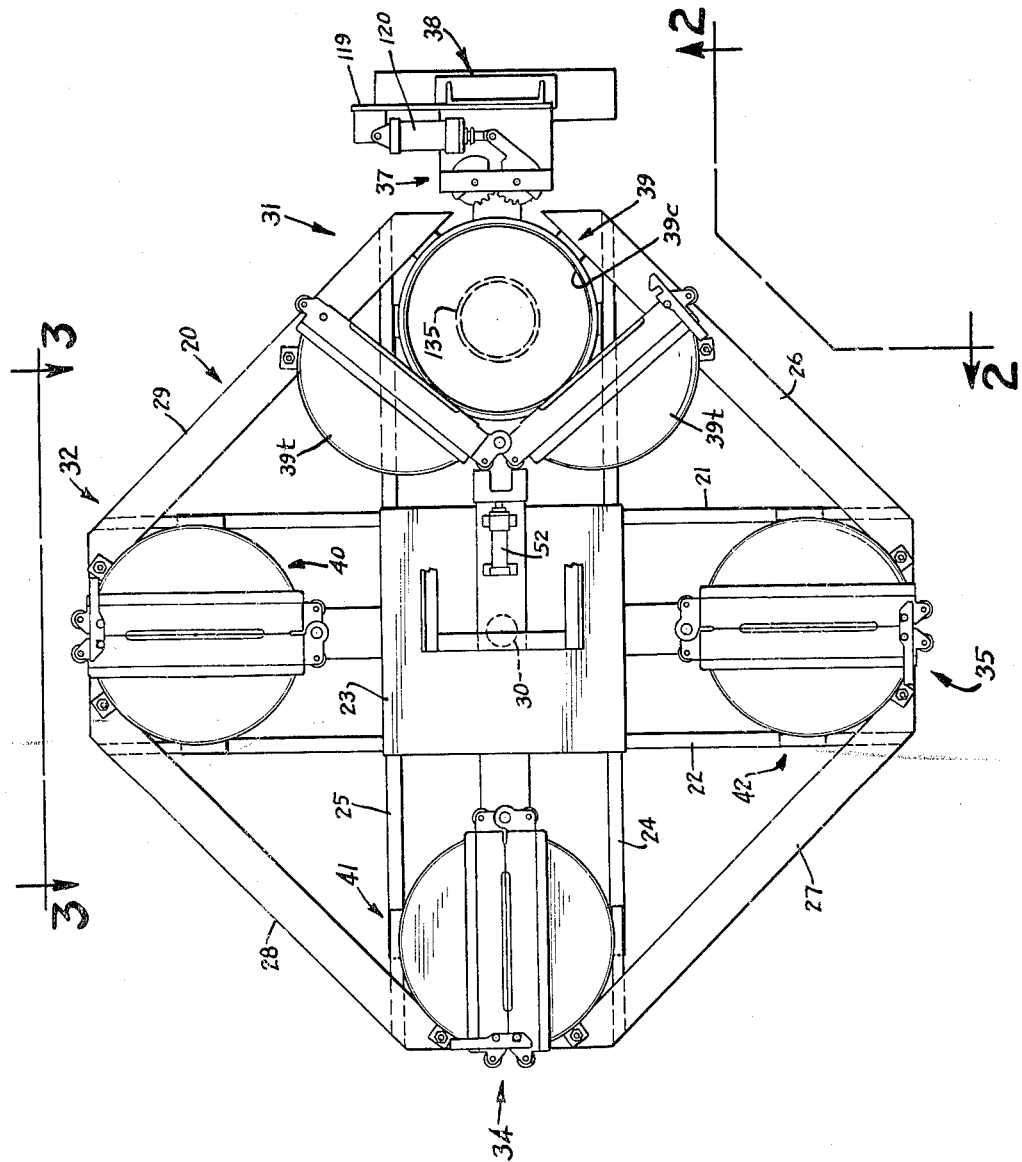
FIGURE 1 is a plan view of the invention; broken lines show hidden parts.

Referring to the drawings and first to FIGURE 1, the machine will be seen to be supported on a frame generally designated 20 including the cross members 21, 22, 24 and 25 which are secured together at their outer ends by the molds and the brace and track means 26, 27, 28 and 29 and at their centers by plate 23. All of these frame members are rotatably supported by a central post 30.

The four corners of the frame as seen above are resting at the various stations of operation of the machine which are: the loading station 31, cooling stations 32 and 34 and the unloading station 35. At loading station 21 is shown the primary lid closing mechanism 36 and the secondary closing and lock actuating mechanism 37. A pier 38 serves as a support for a secondary closing and lid locking mechanism. These structures will be described in more detail in connection with other views in which the parts are shown to a larger scale.

Between the extending ends of each pair of cross arms are the molds generally designated 39, 40, 41 and 42. Each of the molds has top and bottom portions that hinge open as shown with respect to the mold 39 at the loading station. The parts for each mold are designated by the number of the mold plus a suffix letter for the part. For example, 39 with the suffix $t$ are the tops of mold 39. The body or central portion of the mold is designated 39c. Although the bottom of none of the units appear in this figure, where they are shown, they will carry the main mold number designation with the suffix $b$. In the machine there is an extruding device positioned over the loading station 31 but this is not shown in FIGURE 1 in order not to obscure the mold 39.

Figure 2:
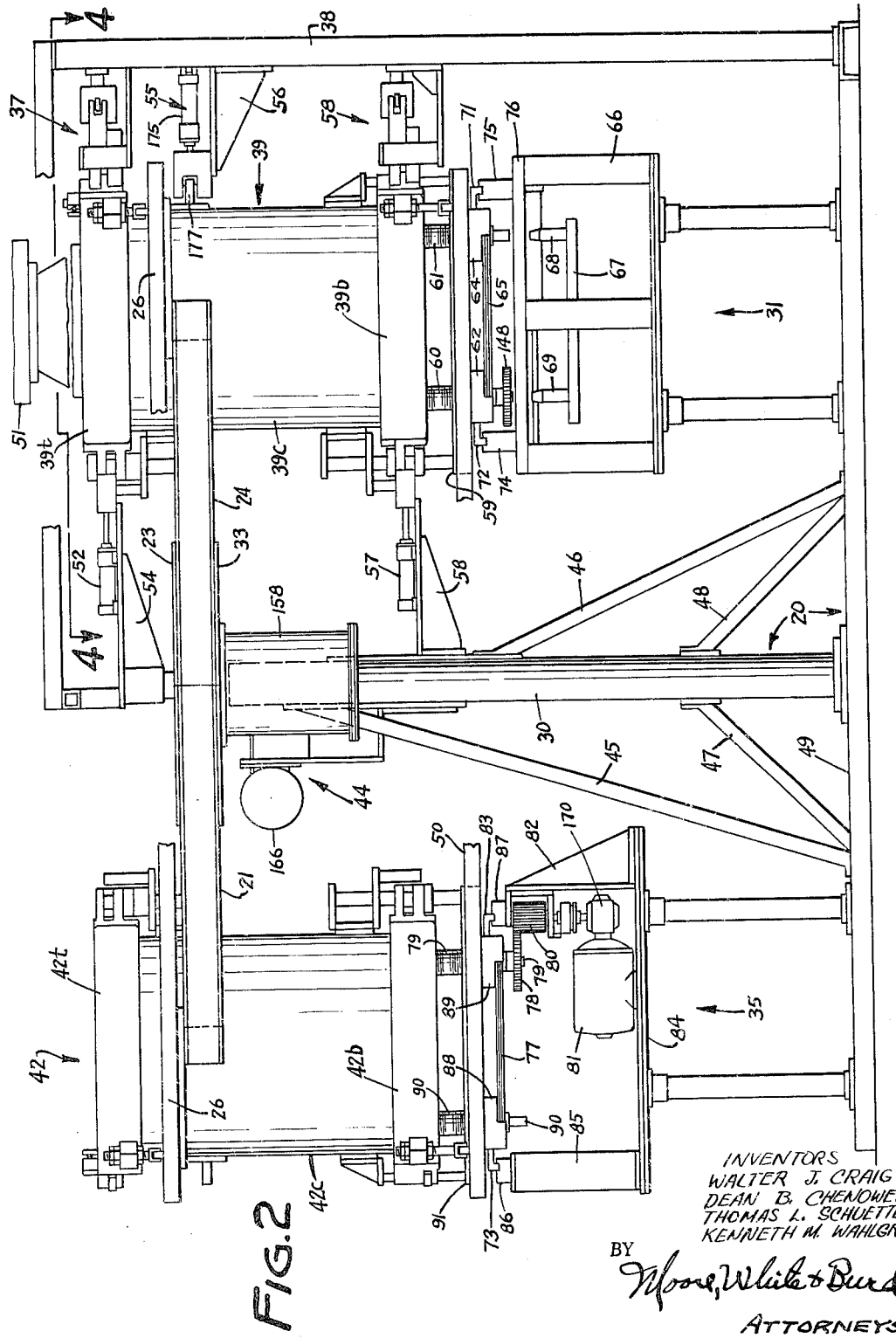
FIGURE 2 is a phantom side elevational view taken as shown by the lines and arrows 2—2 of FIGURE 1; it is drawn to a slightly larger scale than FIGURE 1 with broken lines illustrating hidden parts.

In FIGURE 2, in the central portion of the figure, appears the frame mechanism previously described including column 30. In that view, the ends of cross members 21 and 24 are visible, the former embracing the central portion of mold 42 which is designated 42c and the latter embracing central portion 39c of mold 39. Below the cross members 21 and 24 and near column or post 30 is the indexing mechanism generally designated 44. It will be described in more detail in connection with FIGURES 8 and 9.

A series of braces 45, 46, 47 and 48 engage the center post 30 to stabilize it with respect to the base 49 of the frame. Track-brace 26 appears at the top and a similiar lower track-brace 50 extends across the lower portion of the molds 39 and 42. Above the mold 39, which is shown with its top 39t in the closed position, may be seen a representation of the nozzle 51 of the extruding machine which is not in itself novel.

The closing mechanism for the lid 39t, or the lid of any other mold when it is at the loading station 31, is seen to consist of the primary loading cylinder 52 which is supported on a brace 54 that is mounted on the central post 30. Pier 38 at the right of the mold 39 supports secondary closing and lock actuating means 37. Its detailed structure is much better seen and explained in connection with FIGURE 4, as is true also with respect to the primary closing cylinder 52.

The precise positioning member is driven by a cylinder 55 that is supported on pier 38 by any suitable means such as the shelf bracket 56. To close bottom 39b, there is a primary closing cylinder 57 mounted on the shelf bracket 58 which is secured to central post 30. The secondary closing and lock actuating structure 58 is seen at the right. The closing and locking structures for the tops and bottoms of the molds are substantially identical and will be described in more detail in connection with the large view, FIGURE 4.

Each of the molds has on its bottom a track means, the one for 39 being designated 59 which is secured to and travels with the mold. This track carries the moving nozzles 60 and 61. The details of this structure may vary substantially from situation to situation since this disclosure is a molding machine to set up to make a particular bottle having twin necks. However, the structure described here in deail is very satisfactory for making any sort of a structure having an eccentric portion but this disclosure is not intended to limit the nature of the mold bottom in general. Each of the sprindles 60 and 61 is supported in a block 62 for spindle 60 and 64 for spindle 61 which are the members that actually slide on track 59. These units are linked together by a suitable endless means here shown as chain 65 for a purpose that will become more apparent later.

At station 31 is also supported the subframe assembly 66 which carries the vertically movable structure 67 on which the needles 68 and 69 are mounted. These needles actually penetrate and establish a substantially gas-tight contact with the interiors of spindles 60 and 61. The blocks 62 and 64 are each provided with a hook means 72 for block 62 and 71 for block 64. These hooks engage in the guides in the block members 74 and 75 for the hooks 72 and 71 respectively. Blocks 74 and 75 ride on a track means 76 at the top of subframe 66 and are connected to the mechanism that spreads and brings together the blocks 62 and 64. The structures of the nozzles and needles are shown in considerably more detail in FIGURES 6 and 7 and will be explained in detail with respect to those figures.

At the left hand side of FIGURE 2 is the unloading station 35. A chain similar to chain 65 and here designated as 77 is shown being driven by a sprocket 78 mounted on spindle 79. Sprocket 78 engages the elongated gear 80 which in turn is driven by a suitable motor and reduction assembly 81. The elongated gear 80 and the reduction mechanism of the assembly 81 are supported by a vertical bracket means 82 which is supported on the platform or subassembly frame 84.

The subframe 84 is connected by suitable pylons (not numbered) to the base member 49 of the frame generally designated 20. The subframe 84 includes a vertical member 85 on which is arranged a centering block 86 and above the elongated gear 80 is a similar centering block 87.

The centering blocks engage and hold stationary the blocks 88 and 89 via hooks 73 and 83 for the spindles 79 and 90 respectively. Thus the spindle blocks 88 and 89 which correspond to spindle blocks 64 and 62 respectively are held stationary on their track means 91 during the process of withdrawing the spindles from the interior of mold 42.

Figure 3:
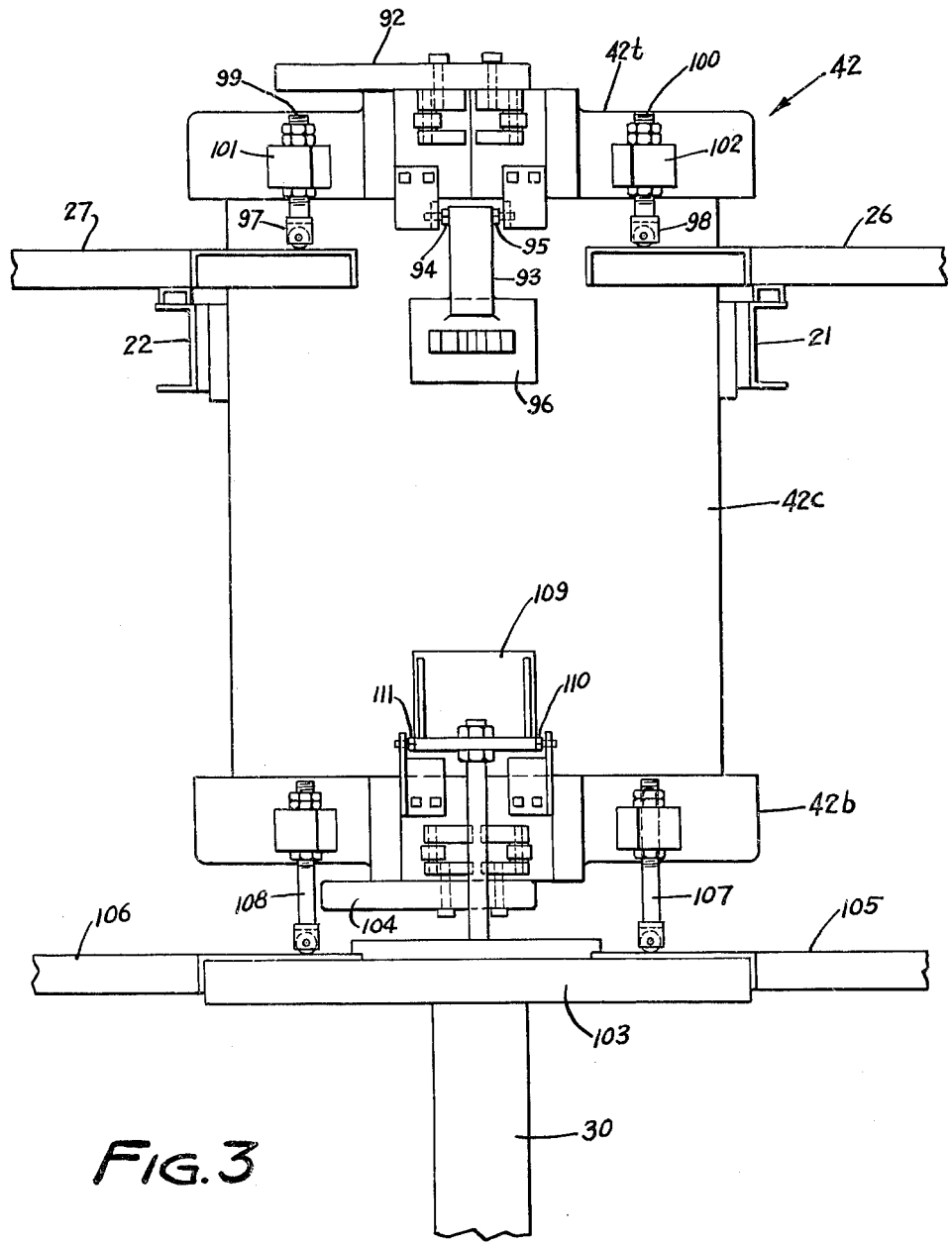
FIGURE 3 is an elevational view of one of the molds in a closed condition and taken on the line and in the direction of the arrows 3—3 of FIGURE 1; broken lines illustrate hidden parts; this figure is drawn to a scale approximately twice as large as FIGURE 2.

Reference is made now to FIGURE 3 for a detailed view of the front of mold 42. At the top of the drawing is seen the locking lever 92 which locks the two halves of the top 42t together. Also clearly visible in this view is an abutment 93 against which the adjustable stops 94 and 95 engage to center the top structure precisely on the body portion or central portion 42c. Support means 96 is welded to the body portion 42c to aid in attaching the abutment 92 to the body portion.

The cross members 21 and 22 appear in end elevation supporting not only the central portion of the mold 42c to which they are rigidly secured as by welding or the like but also the rails 26 and 27. Also clearly shown are the adjustable caster means 97 at the left and 98 at the right to support the outer edges of the heavy top portions 42t. These caster wheels are adjustable by the nut and bolt assemblies 99 for caster 97 and 100 for caster 98. The bolt and nut assemblies extend through ears 101 and 102 respectively. The double nuts on the top of the nut and bolt assemblies is a locking means for assuring a fixed position once the proper adjustment of the casters is made to support the tops at the desired level.

The bottom structure 42b is very similar to the top structure except upside down, of course. A locking lever 104 is seen near the bottom of the structure. A member 103 is secured to rail member 91 (FIGURE 2) and supports the lower track-braces 105 and 106 which provide a surface on which caster assemblies 107 and 108 may roll respectively to support the outer ends of the heavy bottom portions. All the ends of the lower track-braces are identically supported at the molds. A bracket plate member 109 provides an abutment against which the adjustable stops 110 and 111 may come to rest to center the bottom of the mold precisely, as in centering of the top of the mold.

Figure 4:
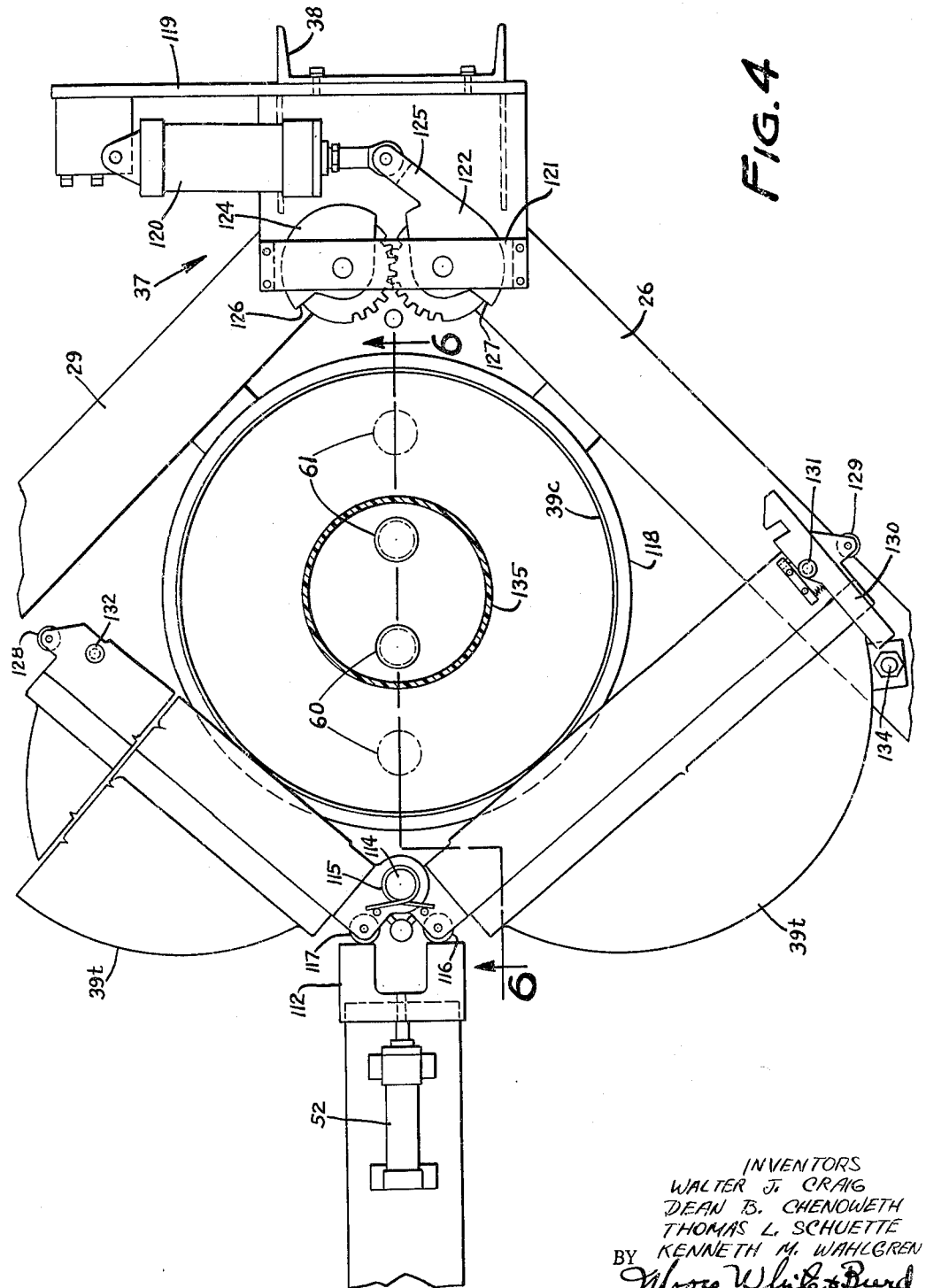
FIGURE 4 is a top plan view of a mold shown at the loading station and taken substantially on the line and in the direction of the arrows 4—4 of FIGURE 2; it is drawn to the same scale as FIGURE 3 with broken lines illustrating hidden and adjusted positions of parts.

Turning now to FIGURE 4, we see the top 39t of mold 39. The top 39t is shown reverted to the open position illustrated in FIGURE 1 even though the section line for FIGURE 4 is shown on FIGURE 2 where the lid is shown in a closed position. The purpose of this is to illustrate readily the sequence of closing. In this view the initial closing cylinder and its pusher plate assembly 112 are shown withdrawn so that the two halves of the top 39t may pivot open about their pivot point 114 under the influence of the spring 115. Similar structures are embodied in the bottom portion. The two top halves also include the rollers 116 and 117 which are shown in abutment on the end of pusher plate 112. With the top and bottom open as shown here, the body 39c is merely a central sleeve having the flanges such as the one 118 on the top shown with which a portion of the lid may react to make a strong pressure resistant unit.

The top of pylon 38 is shown at the top of this figure and a bracket member 119 is secured to the pylon 38. Bracket 119 supports the final closing and locking cylinder 120 of final closing and locking mechanism 37. The bracket 119 also carries the bearing plate 121 on which are pivotally mounted the closing elements 122 and 124. These closing elements are partial gears combined with each other so that the rotation of one rotates both in opposite directions. An arm 125 is pivotally secured to the end of the rod from the cylinder 120. Each of the closing members has shoulders designated 126 for member 124 and 127 for member 122. These shoulder portions 126 and 127 engage and pull into the final stages of closing the lids via the rollers 128 and 129. A lock lever 130 similar to lock lever 92 is seen on the righthand side of the lid 39t. This lever is pivoted as at 131 and engages a pin 132 at the lefthand lid.

In that figure also, a portion of the top supporting caster structure for the righthand portion of the lid may be seen at 134. This structure would be comparable for example to the assemblies 99 and 100 and specifically to the element 99 in FIGURE 3. That portion of the lefthand lid which would carry the caster assembly comparable to assembly 100 is not shown in FIGURE 4 in order to illustrate the structure at a very large scale. The track and braces 26 and 29 are also seen on which the caster wheels roll in order to support the outer ends of the very heavy lids.

In FIGURE 4 also the neck or nozzle forming spindles 60 and 61 appear inside a circle 135 representing the sectional view of the extruded raw material extruded as a tube or parison as it is referred to in the trade. In broken lines, the nozzles 60 and 61 appear in their positions prior to the introduction of the expanding gas.

Figure 5:
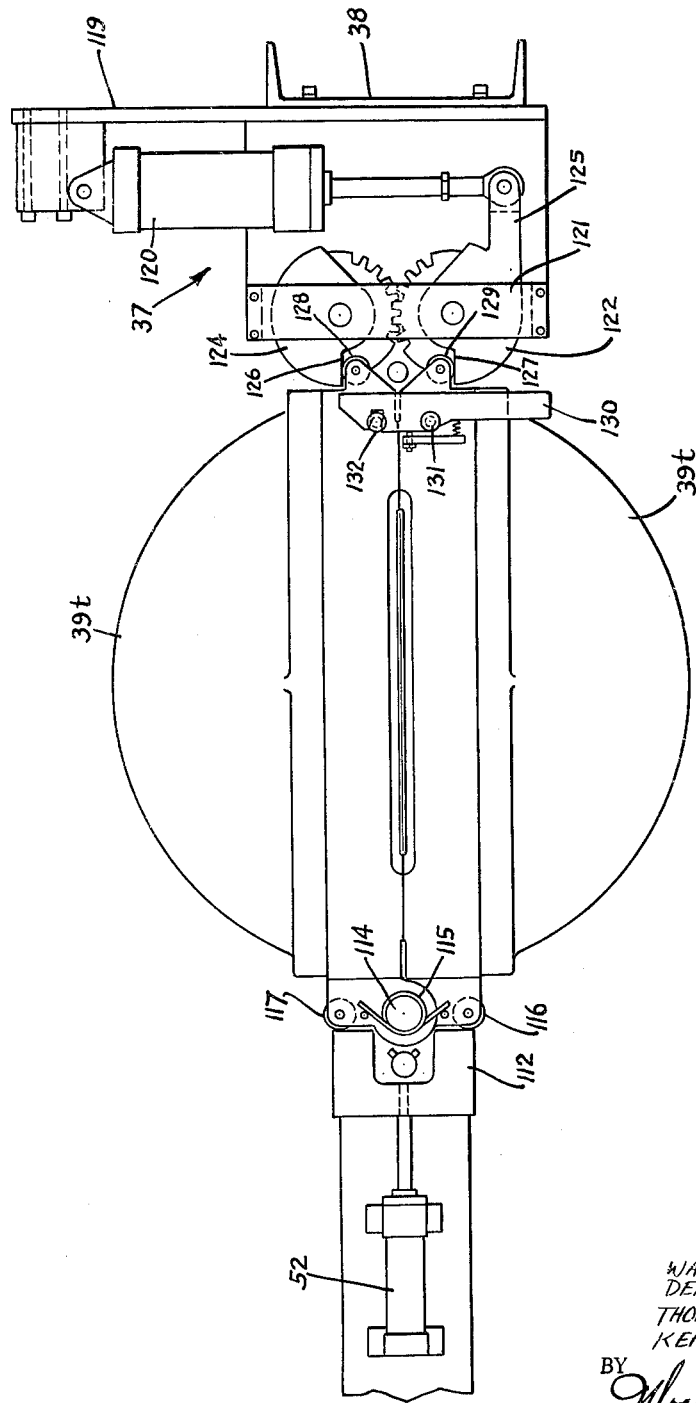
FIGURE 5 is a view similar to FIGURE 4 except that the top covers are shown in the closed and locked position; broken lines again illustrate hidden parts and the scale used is the same as that for FIGURES 3 and 4.

In FIGURE 5, substantially all of the same structure as is shown in FIGURE 4, except that the parison now appears only in broken lines as it is covered by the top 39t. Also, the cylinders 52 and 120 are shown extended, the former preceding the latter and bringing the lid ends within reach of the closing elements 122 and 124. Closing members 127 and 126 may be seen in contact with the rollers 128 and 129. Latch or locking lever 130 is also seen to have engaged with the lock pin 132 and the lid is now securely fastened about the central portion 39c. Cylinder 120 now may be retracted releasing the pressure on the rollers 127 and 128, since the lock lever 130 and latch pin 132 are holding the lid tightly closed.

Figure 6:
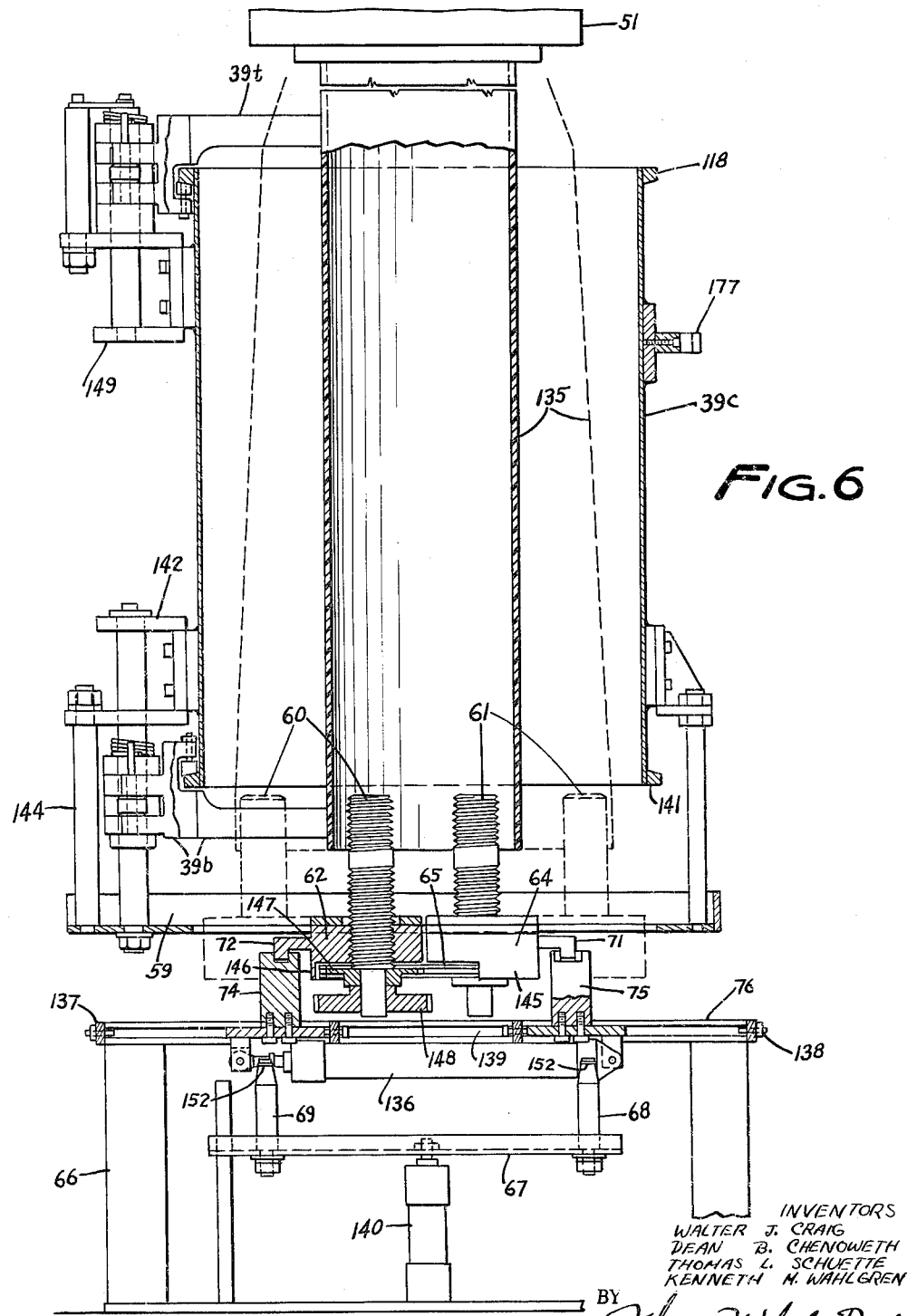
FIGURE 6 is a vertical section taken on the line and in the direction of the arrows 6—6 of FIGURE 4; broken lines illustrate adjusted positions of parts and the scale used is the same as that of FIGURES 3, 4 and 5.

In FIGURE 6, nozzle forming spindles 60 and 61 show clearly both in the solid line position near to each other when the parison 135 is being dropped down over them and in the broken line position illustrating where they are after they have been extended. The cylinder 136 is clearly seen below track 76 and secured to the members 74 and 75 by means of which the hooks 71 and 72 are moved inwardly and outwardly, hence moving with them the spindles 60 and 61. At the outer end of track 76 are the adjustable stops 137 and 138. In the center is a stop unit 139. The cylinder is merely secured to the two slide members 74 and 75 and when cylinder expanding pressure is applied, either one or the other or both move until one engages its stop at which point the cylinder continues to expand until the other engages its stop. This is true in both directions of movement. Gas introducing needles 68 and 69 are also clearly apparent on their yoke 67 and with a cylinder 140 by means of which they can be raised and lowered.

Flange 118 at the top and a similar flange 141 at the bottom of the mold provide means for securing top 39t and bottom 39b to mold center 39c. The mold top 39t and mold bottom 39b incorporate annular grooves which fit these flanges and lock the tops and bottoms securely to the central sleeve portion 39c. The lower hinge bracket 142 is very strong to support the weight of the massive bottoms. These massive closures are necessary to contain the pressures used. This bracket 142 also supports via suitable rod means 144 one end of the track 59 in which the blocks 62 and 64 slide.

In this view, the chain 65 is loose as the result of the spindles being close together and it is held on the sprockets mounted on each of the two nozzle spindles by means of shoes as seen at 145. These shoes are preferably kept to a minimum size and embrace about one-third (⅓) of the circle of the sprocket gears around which chain 65 is reeved. The block 62 has its shoe broken away and only an edge portion at 146 appears clearly. The purpose of this is to allow the sprocket 147 to be shown and a similar duplicate sprocket is secured on spindle 61 so that the two spindles may be interlinked. A gear 148 similar in fact substantially identical to the gear 78 shown at station 35 in FIGURE 2 appears on the inside one of the two nozzles, namely nozzle 60. This gear will later engage the elongated gear of the nozzle withdrawing mechanism at the mold emptying station 35.

A hinge bracket 149 is provided for the top 39t similar to the unit 142 for the bottom 39b. A representation of the extruder nozzle appears at 51 from which the parison extends down through the central portion 39c of the mold 39.

In FIGURE 7, the structure shown in FIGURE 6 is again illustrated, this time, however, with the needles 68 and 69 engaged with the bottleneck forming spindles and with the parison shown expanded out to form the molded article of this particular mold. For this reason, cylinder 140 is shown extended in order to push the needles up. In this figure, the parison is now expanded to be a bottle and is designated 135B. Each of the spindles 60 and 61 forms a nozzle or neck for the bottom, as shown at 135N.

In this figure also, the wedge means that are adjustable in each of the grooves embracing the flanges at the top and the bottom may be seen. With respect to the bottom, one of these adjusting means is shown at 150 and at the top 151. By adjusting these wedges toward or away from the slanting surface of the flanges 141 and 118 respectively, the snugness of the fit of the tops with respect to the body or central portion 39c of the mold may be determined. Some means of sealing the needles 68 and 69 into the nozzle spindles may be necessary. A suitable means is shown herein as the O-ring 152. Within each spindle also is a check valve 153 to hold pressure in bottle 135B until the spindle is withdrawn.

Figure 8:
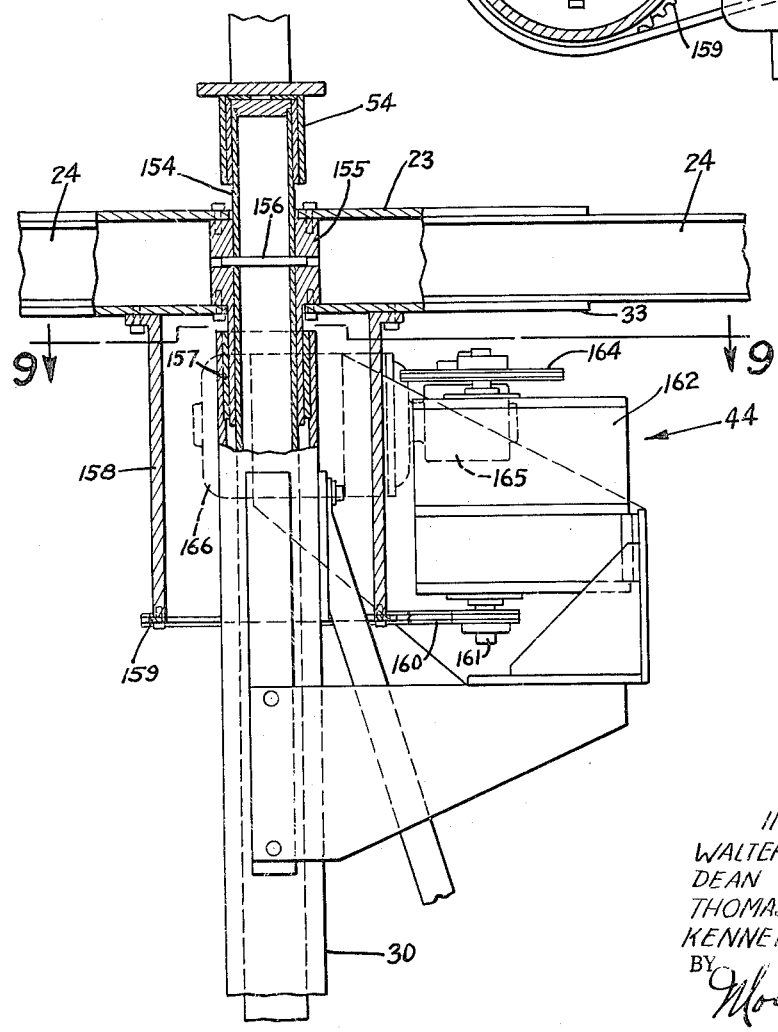
FIGURE 8 is a fragmentary partial section, partial side elevation of the indexing mechanism for the entire structure; broken lines illustrating hidden parts and drawn to the same scale as FIGURES 3–7.

In FIGURE 8 the central post element 30 is shown in fragment and interior of it is the rotating post member 154. Cross arm 24 is shown embraced by the plates 23 and 33. These plates are rigidly secured to a center collar member 155 which in turn is suitably secured as by pin 156 to the rotating post 154. Suitable journal material as at 157 is inserted between the stationary post 30 and the rotating post 154. Drive drum 158 embraces the upper end of post 30 and has a gear 159 formed at its bottom. This gear is connected by a suitable chain 160 with a sprocket 161 on their reduction unit 162. The reduction unit is connected by a gear and chain arrangement 164 to a secondary reduction unit 165 which in turn is directly coupled to the driving motor 166. Thus whenever the motor is energized by the reduction train just described, the entire cross arm assembly carrying all of the molds is rotated. In actual practice, it is rotated only 90 degrees at a time to index the molds from one station to the next.

Figure 9:
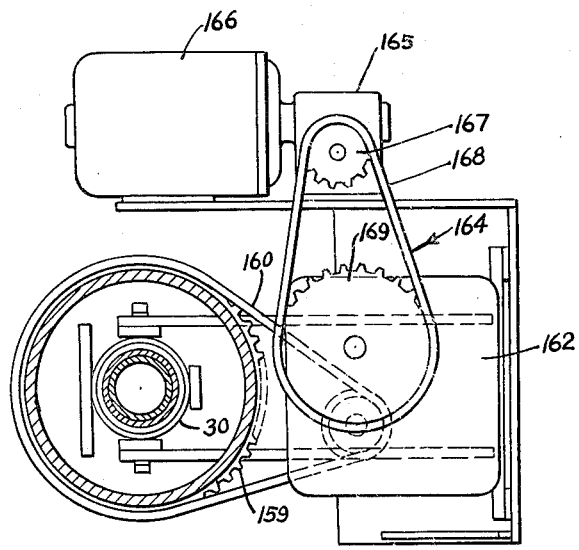
FIGURE 9 is a horizontal section taken on the line and in the direction of the arrows 9—9 of FIGURE 8; broken lines illustrate hidden parts, and it also is drawn to the same scale as FIGURES 3–7.

In FIGURE 9 the drive assembly between the secondary reduction system 165 and the primary reduction unit 162 may be seen in detail as comprising the spur gear 167, chain 168 and the driven gear 169.

Figure 10:
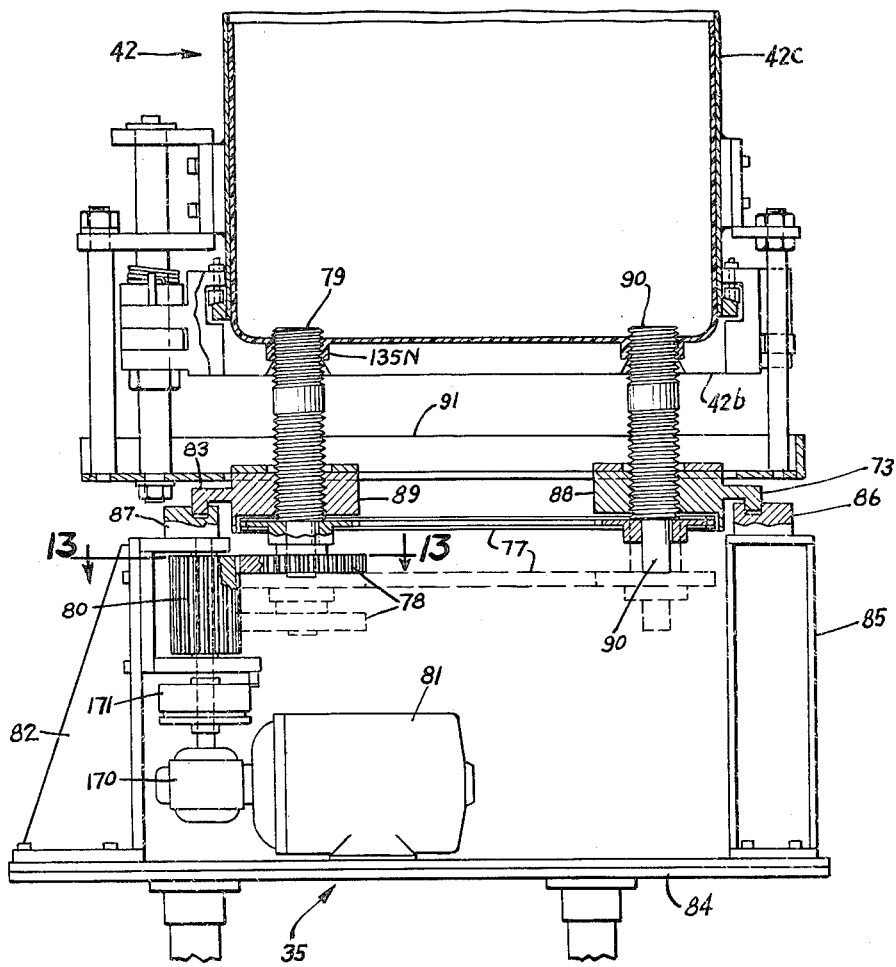
FIGURE 10 is a fragmentary sectional view similar to the view of FIGURE 7 but shown at the mold unloading station; broken lines illustrate hidden parts and the scale used is the same as that in FIGURES 3–9.

In FIGURE 10 the structure and operation of the spindle withdrawing mechanism is shown, mold 42 is shown positioned at the removal station and the motor 81 with its reduction gearing structure 170 and clutch 171 are shown. The position of gear 78 when the removal operation starts is shown in solid lines and in broken lines gear 78 is shown after it has been backed down the long gear 80. Each of the bottlenecks in this particular molding project are internally threaded. The spindles 79 and 90 are externally threaded to match threads in the blocks 88 and 89 which have the same pitch diameter as the threads of the internally threaded nozzles of the molded bottle. As the gear 78 is rotated in a direction to back the spindles 79 and 90, out of the threads in the blocks 88 and 89, they are likewise unthreaded from the internal threads of the bottlenecks. In this maner the spindles 79 and 90 may be removed from the molded threads of the bottlenecks without injuring them. Elongated gear 80 continues to provide driving force even as the spindles 79 and 90 are withdrawn. Thereafter the locking levers for both the top 42t not shown and the bottom 42b are released and the end closures opened by the springs such as the one 115 in FIGURES 4 and 5 together with a manual assist. The bottle is then merely captured in a straight sided central portion of the mold 42c and may slid out of the top.

Figure 11:
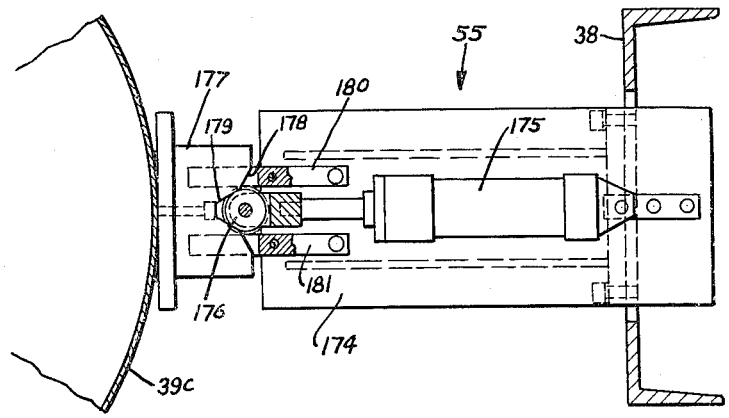
FIGURE 11 is a fragmentary plan view of the mechanism for centering the molds under the extrusion nozzle after indexing has occurred with broken lines illustrating hidden parts and portions of the structure broken away to show construction fully; this figure is drawn to a scale larger than any preceding scale used.
Figure 12:
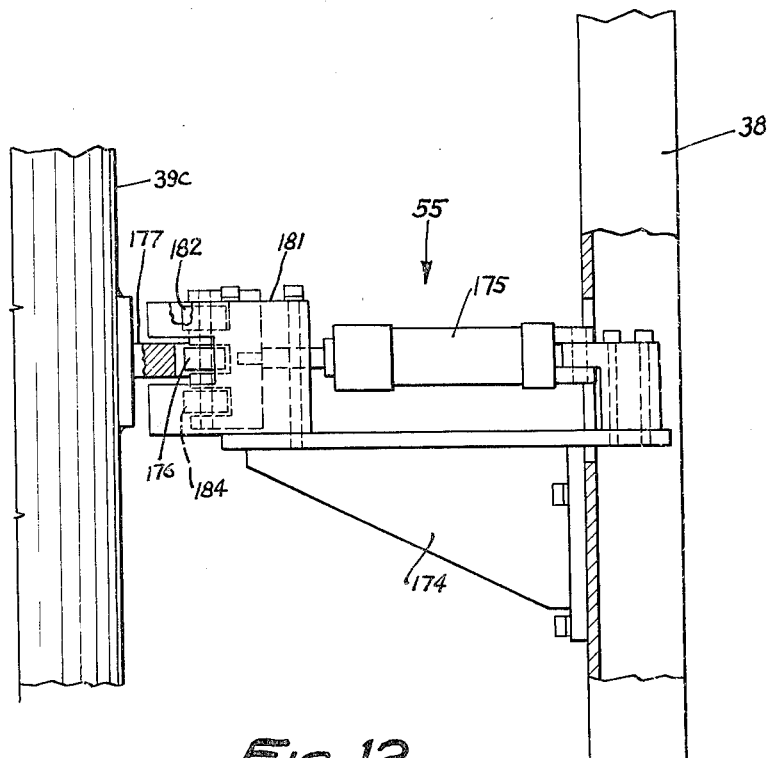
FIGURE 12 is a side elevation of the structure illustrated in FIGURE 11 and drawn to the same scale; broken lines illustrate hidden parts.

Turning now to FIGURE 11, the final positioner portion of the indexing structure is shown on shelf bracket 174 secured to pylon 38. Any suitable actuator such as cylinder type motor 175 is secured to shelf 174 and has at the outer end of its piston rod a roller 176. The body portion or central portion 39c of the mold 39 (the other molds have similar structure) has a plate 177 rigidly secured as by welding thereto which plate has a notch into which the roller 176 of the cylinder 175 enters. This notch is a two phase one having a broadly slanting outer portion 178 and a steeper sided center portion 179. As the roller 176 is forced into this notch, it forces the body portion 39c of mold 39 to be moved either forward or backward slightly to center precisely a mold under the extruder.

Roller 176 is accurately positioned by the guideways 180 and 181 which are on either side of it. Since the plate 177 must engage the roller 176, however, the rollers that actually engage the guides 180 and 181 are above and below the roller 176. These rollers are 182 and 184. They are mounted on the same shaft as the roller 176 and therefore keep the roller 176 accurately positioned. As the molds are all tied together, the accurate positioning of one of them together with the accurate positioning of the molds in relation to each other in the first instance accurately positions a mold such as the one 42 at the emptying station. As mold 42 advances to the loading station, the other molds each advance 90 degrees also to the respective new positions.

Figure 13:
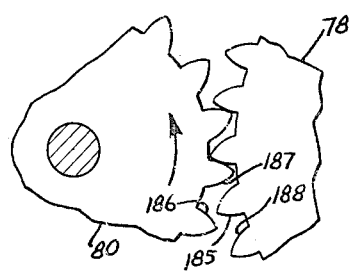
FIGURE 13 is an enlarged fragmentary view taken on the line 13—13 of FIGURE 10 and drawn to the scale of FIGURES 11 and 12.

In FIGURE 13 the profiles of the teeth of gears 78 and 80 are shown to be the normal gear profile on one side as at 185 on gear 80 and 186 on gear 78. These are the sides of the gear teeth that are engaged when the gears are under a load condition as when withdrawing the spindles from the molded bottlenecks. When the spindles are simply being run up as in returning the spindles to their molding position prior to filling the mold with parison, the surfaces of the gears are cut away as shown at 187 on gear 80 and 188 on gear 78. These slanting gear surfaces are noisy and inefficient as there is always some sliding motion between the slanting surfaces 187 and 188 of the gear teeth of the driving gear 80 and the driven gear 78. On the other hand, because there is little or no load on the mechanism at the time when these gear teeth are engaging each other to drive the spindles up, the amount of noise and wear is relatively slight. Furthermore, the advantage gained in having this structure is considerable. When the molds are indexed and a fresh mold is swung to station 35, the gears on the various molds corresponding to gears 78 shown in FIGURE 2 may or may not have their gear teeth in a position to mesh neatly with gear 80. By cutting off one side of each tooth on both gear 80 and gear 78, the surfaces of the gears that are presented to each other are always slanted so that there is no possibility of the gears jamming, as they are brought together. If all of the gear teeth have the usual gear profile on both sides, their outer ends would be flat and create the possibility of jamming the mechanism if these flat surfaces should by chance come together.

Figure 14:
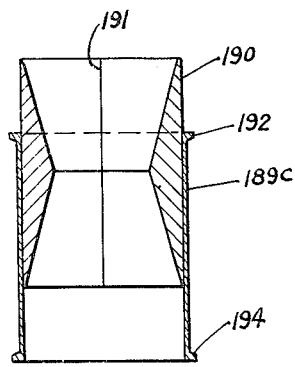
FIGURE 14 illustrates, diagrammatically, how a mold of this type may be made for a shape of object having a center portion smaller than its ends; it is drawn to the scale of FIGURE 1.

In FIGURE 14 is shown a means for molding articles that are smaller in their center portions than they are at their ends while using the mold system of the present invention. In this view, a mold center portion 189c is shown provided with an insert 190 which may be slidably engaged in or removed from the mold center portion 189c. This insert in turn is divided as at 191 by a suitable division arrangement so that once the insert 190 has been removed from the confining sleeve or center portion 189 of a mold, the insert 190 may be separated into two halves and a molded article having a reduced center portion easily taken from the mold. In this manner, it is possible to employ the solid sleeve or central portion mold concept with the flanges 192 and 194 for receiving the top and bottom members and at the same time retain all of the advantages of using the open end sleeve 189c as far as the use of simple locking levers and so forth to hold the mold against the pressures required to form the molten plastic material by blowing. Thus, the novel mold of this invention is not limited to an article having center portions that are of equal dimensions as its ends. Obviously the same structure could be used to produce an article having any kind of an irregular surface. The mold 191 having a reduced center portion is merely being shown as illustrative of the concept.

We turn now to a description of the control mechanism for this device. The control mechanism is shown schematically in FIGURE 15, since the controls themselves are all units that are well known and are simply adapted to this particular context. As the combination for this particular purpose may be novel, however, and certainly is useful to a complete understanding of this machine, the inneraction of the electrical control circuits will be explained.

The lines LI and LII may be connected to suitable power lines by a master control switch as shown schematically at 195. Near the top of the diagram at the righthand side is the relay coil R6, also designated 196, having in parenthesis below its designation R6 the number 3. The parenthetical number indicates the number of sets of points actuated by this relay coil. The three sets of points operated by relay R6 are at the left hand side of the diagram. Beginning near the top is R6a and directly below it R6b. R6c is about half way down the diagram below R6a and b. The points R6a and R6b are both normally open as shown by the two opposed parallel lines. R6c on the other hand, when the relay is unenergized, are closed as shown by the diagonal line connecting the two spaced relay contacts. All of the relays involved will be similarly designated by an R-number to designate the relay with a number in parenthesis below it indicating the number of points actuated by the relay. In addition, the points or contacts themselves will be identified by the same R-number as their operating coil followed by small letters indicating specific contacts operated by the coil.

Immediately below R6a and b are the points R5a. The coil for operating these points is about three-fifths the way down the diagram in the center side to side and assigned the number 197.

At the righthand side of the drawing below and slightly to the right of the relay coil R6 is the relay coil R3 also designated 198. This relay coil as indicated by the parenthetical number has two sets of points one of which is slightly above it and to its left and the other set of points operated by the relay coil R3 are near the bottom of the diagram at about the center from side to side. This latter set of points, R3b, is connected to one of the circuits powered by the rectifier.

Slightly to the left of the coil R3 is the coil R1 also designated 199. This coil also actuates two sets of points both of which are to the left of and below the coil, the set of points R1a being slightly above the points R1b. The points R1a are normally open and the points R1b are normally closed.

Below and slightly to the right of the relay coil R1 is the relay coil R2. This is also designated 200, and it is about the same distance from the bottom of the diagram as the relay coil R5. R2 also has two sets of points and these points are directly to the left of it, one slightly above the other. The relay points R2a are normally opened while R2b are normally closed.

Slightly below and about half-way between R5 and R2 is the relay coil R9 also 201. This coil controls four sets of points. One set of points, R9a is directly to the left of it and connected in parallel with the switch that energizes, in the first instance, the coil and serves as a set of holding points. The other three sets of points will be seen in the separate motor portion of the bracketed electrical diagram. They are all three in the motor line to control the 440 volt indexing motor.

To the right and slightly below R9 is the relay R7 also indicated as 202. This relay has six sets of points. One of them, R7a will be seen to the left of this relay and connected in parallel with the momentary start switch for this circuit and serves as a holding set of points. The set of points R7b will be seen in the circuit directly below the one in which R7a appears and is normally closed but opened whenever the relay is energized. This set of points is connected in series with the circuit for operating the motor in the other direction. Once the relay R7 is energized, there is no possibility of energizing its counterpart relay R8 by reason of this set of points of the relay R7 in the R8 circuit. The third set of points for relay R7, the points R7c are below the rectifier and hooked into the circuit controlling the magnetic clutch for the rotation of the spindles. The other three sets of points for the relay R7 are in the spindle motor circuit, and they each close one of the three lines supplying the spindle motor with power when it is rotating in a given direction, in this case to withdraw the spindles from a molded bottle.

Below R7 directly is the relay R8 also identified as 204. This relay also has six sets of points which correspond to the six sets of points for relay R7. Points relay R8a are connected in parallel to the momentary start switch for the up rotation of the spindles, the points R8b which are normally closed are connected in series with the relay coil R7, a third set of points R8c are connected in parallel with the points R7c to operate the magnetic clutch for the rotation of the spindles in the up direction, and the three points R8d, e and f are found in the spindle motor circuit.

Switch 205 which is turned on at the beginning of operation and left on and acts as the master switch for all of the power coming to the motors which lines are designated LIII, LIV and LV may be reversed with respect to the spindle motor by closing either the points R7d, e and f or R8d, e and f. Notice that the connections between the lines LIII, LIV and LV and the lines extending to the spindle motor is just exactly opposite for the joints R8 as for the points R7.

In addition to the relays the control system employs a series of solenoids most of which operate valves. Near the top of the drawing and slightly to the left and above the relay coil R6 is seen the solenoid 205 which operates when it is energized, a valve that applies hydraulic pressure to the parison ejecting structure of the molding machine. In this particular machine, a piston is withdrawn to draw molten plastic material into a storage place in a fixed amount and then when the solenoid 205 is energized, the piston (not shown) moves in a reverse direction to discharge that fixed amount of plastic through the ejector nozzle 51. This unit is also labelled ES, standing for extrusion solenoid.

Directly below and to the right of solenoid 205 is a second solenoid labelled IU or index unlock, also given the number 206. Following down the righthand side of the drawing is a solenoid 207 which actuates the valve to supply air to the lid locking mechanism. It is labelled LL for lid lock. Directly below the solenoid 207 is one 208 for expanding the parison into the molded article so it is labelled PM for parison mold.

Slightly below and to the right of solenoid 208 is the one 209 which controls the cut-off of the parison, and it is also marked PC for parison cut. Slightly to the left and below 209 is the solenoid coil 210 which is the rapid lid closer valve, and it is labelled LC for lid closer as opposed to LL for lid locking unit 207.

In the next circuit down and to the left of 210 is the solenoid 211 which controls the air to spread the spindles. It is also labelled SS for spindle spread. Slightly below and to the left of 211 is the solenoid 212 which is the valve controlling the movement together of the spindles, and hence it is labelled ST for spindle together.

The system also uses a number of limit switches. Near the top left of the diagram is the limit switch 214 which when it is opened by the full extension of the parison extruding unit breaks the circuit calling for extension and automatically returns the extension unit to its loading position in preparation for the next extrusion. Hence it is labelled ER for extrusion return. Directly below it is a limit switch 215 also labelled EI for extruder initiate, because this limit switch is closed whenever the extruder is completely withdrawn and ready to extrude a fresh parison.

In the next circuit below these two units is a limit switch 216 also labelled IUH since it is the index unlock holding switch and is closed during rotation of the frame 10. Slightly below and to the right of limit switch 216 is the limit switch 217 also labelled SU for spindles up. This switch is closed whenever the spindles are in their fully up position and otherwise open. Two circuits down and substantially to the left is a limit switch 218. This limit switch is closed whenever the index lock is engaged with a mold in order to lock the unit in its indexed position ready for loading and moulding. It is therefore labelled IL for index lock.

On about the same level with 218 and in the center of the diagram side to side are the limit switches 219 and 220. Between these two limit switches are the letters RLC standing for rapid lid closer. These switches are closed, one by the top and one by the bottom, whenever the rapid lid closer has moved to its fully actuated position. Directly below 219 is 221 and directly below 220 is the limit switch 222. These two switches have between them the letters FL standing for final lock. These two switches are closed whenever the lid locking mechanism has been actuated.

Slightly below the final lock mechanism limit is a limit switch 224 which is the spindle apart limit switch, therefore, labelled SA. This switch is closed only when the spindles are most widely spread. At the lefthand side of the diagram and about three-fifths of the way down its length appears a two position limit selector switch 225 also labelled ED standing for extrusion done. It is in the position illustrated until an extrusion of parison is completed at which time it is moved to its other terminal in order to complete the circuit to the solenoid 211 for the spindle spreading.

In the two circuits for the relays R7 and R8 are the limit switches 226 and 227 respectively. These two switches are labelled SD and SU standing for spindles down and spindles up respectively. In each case they remain closed except when the spindle mechanism has been moved to the limit for its throw either up or down in which case the limit switch for that particular direction is forced open.

Below the rectifier at the lower righthand side of the diagram is the limit switch 228. Switch 228 is the needles down limit switch, and it is labelled ND as well as being numbered.

Directly below this limit switch is the switch 229 which is the indexing limit and it is marked IS for index stop. This switch is closed only after some rotation of the molds has been started by holding closed a manual switch controlling relay 3. Once this switch is closed, however, the circuit for the magnetic clutch 230 remains complete until the machine reaches the next station in indexing, at which time it is forced open. Directly below the clutch 230 is the clutch 231 which is the clutch for the spindles so it is marked FC while clutch 230 being the indexing clutch is marked IC.

In addition to the two master switches 195 and 205 there are a series of other manual control switches. At the top of the diagram and slightly to the right of center is a normally closed manual switch that is labelled EE standing for extruder emergency and assigned the number 232. This switch when pushed will stop the extruder from continuing an extrusion by interrupting the circuit for relay R6. Slightly below and to the right of switch 232 is switch 234 that is the indexing start switch and labelled IS. Indexing is commenced by this switch being manually operated.

At the lefthand side of the drawing is a switch labelled PS for pressure switch and it is open except when pressure applied to mold an object reaches a predetermined value. It is also identified as switch 235. Directly below it is switch 236 which is a manual means for operating the indexing mechanism even when there is no pressure applied to the mold. This switch is labelled EI for emergency indexing switch.

Four circuit lines below the switch 236 and over on the righthand side of the diagram is the switch 237 which is a selector switch manually operated to choose between manual parison cut-off and automatic parison cut-off. Hence it is labelled PC for parison cut. Over to the left and below the hand switch just mentioned is switch 238 which is the cycle start manual button.

The next circuit line down and over to the lefthand side of the drawing is a manual switch 239 which is an indexing interrupt switch or II. In that same circuit and to the right is the indexing motor start switch IMS. It is also identified as switch 240. Below and slightly to the left of switch 240 is switch 241 which is a spindle interrupt manual control and hence labelled SI for spindle interrupt. SUD is the four-way selector switch generally designated 242. A portion 242a is a momentary contact starting switch for the spindle down movement which is interconnected by mechanical linkage represented by broken lines with the portion 242b which in turn interrupts the circuit for the spindle up mechanism controlled by relay R8.

Similarly a momentary contact portion 242c is a spindle down control while its counterpart 242b, mechanically linked to 242c as shown by broken lines, is a momentary interrupter in the spindle down line. In the motor control circuit for the indexing motor are a pair of overload devices connected in series and identified as 244 and similar overload devices 245 protect the spindle circuit against excessive current. A rectangle representing a rectifier and so labelled is also numbered 246.

*Operation*

In discussing the operation of this device, such wire leads as need to be numbered will be at that time assigned a number.

After the switches 195 and 205 have been turned on so that the system generally is supplied with power, a cycle start switch is pushed to provide a path for current from the line LII through the indexing lock limit switch 218, to a secondary power supply line 247, the extrusion done selector limit switch 225, closed points R2b, the then closed cycle start switch 238, the coil of relay R5, and via the lead 248 back to LI. There is a parallel path of current, beginning at the point where R5 is connected, to the spindle together valve solenoid 212 so that the spindles are moved in toward the center of the area directly beneath the nozzle 51 (FIGURE 2).

With the energizing of R5 the points R5a near the upper left corner of the diagrapm are closed and a path for current is then provided from LI through R5a, the extrusion initiation limit switch 215, across through the extrusion emergency manual control 232, the coil R6, unit 196 and back to line LI. This energizes R6. As soon as the three sets of points for relay R6 are actuated by energizing R6, a path is immediately established from LII through R6a, through the extrusion solenoid 205 and to LI. This causes the valve controlling the hydraulic pressure for the extruder accumulator to be applied and the parison is extruded down through the mold and around the spindles.

The cycle start switch 238 need be held closed only long enough for a movement of parison to being, for as soon as it does, a limit switch 214, extrusion return, is closed and a circuit for the coil R6 is supplied via the relay points R6b, the extrusion return limit switch 214 and thereafter through the same line as energized R6 initially back to line LI.

When the parison has been completely extruded, the switch 225, extrusion done limit switch, is moved from the position shown to its opposite position and makes a contact at the point 249. As soon as this circuit is complete, power from line 247 flows through the extrusion done limit across line 250 and to the multiple circuit for the relay coil R2, the spindle spread solenoid 211 and the spindle apart limit switch 224 in series with the lid closer solenoid 210. With the actuation of relay R2, the relay points R2a at about the center of the diagram top and bottom and slightly near the lefthand side thereof are closed which provide a holding circuit around the extrusion done limit switch 225 to continue energizing the circuits just mentioned. At the same time the relay points R2b slightly to the right and below the relay points R2a are opened and thereby assuring that one cannot accidentally start another parison extrusion while one is already in a mold and being operated upon.

Upon the solenoid 211 opening the air line to cylinder 136 (FIGURE 6), the spindles are spread apart. After the spindles reaching their apart position, the limit switch 224 is closed thereby applying current to the lid closer solenoid 210.

The energizing of this solenoid causes an air valve to be moved so as to supply air to the cylinders 52 and 57 (FIGURE 2) as to extend them to push both the top and bottom lids closed on the molten parison still connected to the extruder. This action cannot occur, however, until the spindles are properly located. As the lids go closed, the limit switches 219 and 220, one for each of the top and bottom lids are closed thereby providing a circuit for the lid locking solenoid valve 207.

Upon the energizing of relay R2, the circuit for relay R5 was interrupted. The points R1b which are normally closed when the coil R2 is not energized, will allow current to flow from the sub-power line 247 across and through relay R5 when R2 is energized. The opening of points R2b also assure that the spindle together solenoid 212 cannot be energized.

Energizing coil 207 by the closing of points R2a causes a valve to extend the lid locking cylinders such as the one 37 in FIGURE 1 thereby causing the locking members to rotate toward the pins on both the top and bottom of the molds causing their respective lock levers ot become engaged. With this occurrence, the limit switches 221 and 222 are actuated and a path for current can then be traced from line 247 through the closed points R1b and through the two limit switches 221 and 222 to the solenoid coil 208 to line LI. This applies air pressure through the needles to inflate the parison.

At the same time that air is being supplied to inflate the parison and mold it as the result of the operation of solenoid 208, the solenoid 209 is energized which provides air to a cylinder that causes the parison to be cut directly above the top of the mold. The physical structure for this cutting equipment is not shown, but the solenoid is here illustrated because it is part of the electrical circuit. The cutting means itself is a one commonly used for this purpose and any suitable cutting means may be employed. If it is desired to control cutting of the parison manually, the switch 237 is placed in a neutral position so that the circuit does not operate automatically. The cutting means is actuated then only when switch 237 is held in contact with the point 251. The line 252 interconnects LII with the switch terminal 251 of switch 237 whenever the relay R6 is de-energized since this circuit extends through the relay points R6c.

The needles are controlled by a parallel air circuit in connection with the lid closing solenoid valve. Thus the needles up cylinder is extended prior to the actuation of solenoid 218 which opens the air valve to supply air for molding.

Once the air for molding has been applied, pressure begins to build up in the pressure switch 235 (see the upper left quarter of the diagram) and upon air pressure reaching a predetermined value, this switch is closed. As soon as this switch is closed, a circuit for electrical current is provided from LII through that switch and down to the relay coil R1, unit 199. This unit is also connected to line LI by a direct lead and hence the circuit is completed to energize the relay coil R1.

As soon as relay coil R1 is energized, the points R1b (three circuits below the pressure switch 235) are opened and in so doing the circuit to solenoids 207 and 208 are broken. De-energizing solenoid 207 causes the lid locking structure to return to the position shown in FIGURES 1 and 4. Simultaneously the valve which has been moved to a position to apply air to the mold returns to its other position which cuts off air to the mold, when the circuit for solenoid 208 is broken.

With R1 energized, the points R1a close and in so doing provide a holding circuit through the indexed and locked limit switch 218 which is closed whenever the machine is locked at an indexed location and through the points R1a thereafter through the lead 254, lead 255 and lead 256, through the spindle up limit switch 217 and finally to the manually controlled indexing start switch 234. At this time the indexing start switch 234 is pushed which provides a circuit via points R3a to energize solenoid 206 that actuates a valve to retract cylinder 175 (FIGURE 11) which unlocks the frame for rotation. Rotation does not actually start, however, as the needles are not yet withdrawn and limit switch 228, the needles down limit switch, is still open. As soon as cylinder 175 unlocks the frame, however, the limit switch 218 is opened which de-energizes line 247. Since line 247 supplies power to lid closer 210, the opening of switch 218 causes the lid closers to be withdrawn and the needles to come down. Rotation actually being when the needles close the needles down limit 228. If the indexing motor is operating, this will produce indexing.

If the operator has neglected to push switch 240, the indexing motor start switch, nothing will happen. Upon making sure that the switch 240 is energized, however, which holds the relay R9 in a closed position through the holding points R9a that are in parallel to switch 240, all of the relay points R9b, c and d are closed, thereby applying power to the indexing motor. With the indexing motor running and the points R3b closed, the clutch operates and the machine begins to index. As movement is started, the index stopping limit switch 229, connected in parallel with the points R3b, is closed by having the machine moved out of the indexing position. At the same instant that the machine moves, the indexing unlock hold limit switch 216 closes thereby applying continuing power to the index unlock solenoid 206. Also, with the continual application of power to rotate the frame structure, the index lock limit switch 218 is opened, thereby breaking the auxiliary power circuit to line 247. In this way, all of the mechanism that should not be operating when the machine is indexing is disabled.

On the completion of the indexing rotation, the limit switch 229 is again opened by the action of the mold frame itself and power is cut off to indexing clutch 230. Thereafter, the indexing motor runs freely without driving the frame. With the machine coming approximately on location by being driven by the indexing motor, indexing unlock hold is again opened by this same frame action, and the index unlock solenoid 206 is de-energized, because relay R3 is de-energized and dropped out as soon as the indexing start switch 234 is released. This causes the piston of the index lock cylinder 55 to be advanced causing roller 176 to engage plate 177 and thereby pulling the machine into true index. As soon as this happens, the index lock limit switch 218 is closed again and power is once more supplied to line 247. The repetition of this cycle three more times places a filled mold at station 35, the unloading station.

Thereafter, an operator moves the selector switch 242 to the "down" position that is closing the circuit 242a and opening the circuit 242b. This assures that relay R8 is de-energized thereby leaving the points R8b closed and energizes relay R7 via 247 (the indexing spindle interrupt switch), the spindle up-down switch 242, relay points R8b through the spindle down limit switch 226 which is closed until the spindles reach a down position and the relay coil R7. The overload circuit breakers 245 of course are closed unless current becomes excessive. As soon as the relay R7 is energized, all of its points that are opened are closed and all of the closed points are opened. Thus, the points R7b are opened and the circuit for a relay coil R8 is continuously opened while relay R7 remains energized. At the same time all of the points R7a, c, d, e and f are closed which provide: a holding circuit in parallel around switch 242a, completes the circuit to the spindle clutch 231 via the points R7 and provides current to turn the spindle motor in a direction to withdraw the spindles from the molded article. In withdrawing the spindles, not only are the spindles removed from the bottle, but also molding air pressure, locked in by the check valves, is released. Release of the air under pressure in the mold contributes to cooling the molded article.

As the spindles reach their down position, the spindle down limit switch 226 and the circuit for relay coil R7 is opened thereby de-energizing relay R7 and stopping the spindle motor as well as disengaging the clutch for it. The mere operation of spindles toward the down direction of course closes the limit switch 227 for the spindle up position.

As soon as the spindles are removed, the lid locks 92 and 104 (FIGURE 3) can be manually unlatched and the lids are opened by the springs on their hinge pins with a manual assist if necessary. As soon as the lids are completely out of the way, the molded article may be slid endwise out of the mold center portion and the mold is then ready to be indexed into the molding position once more.

While the operation of blowing the spindles and unlocking the mechanism is being carried on at station 35, another mold is being filled and the raw material being molded at station 31.

Once the mold is empty, then the operator pushes the spindle up-down switch 242 to the "up" position, that is to say, closes circuit 242c and opens circuit 242d. As soon as this happens, relay coil R8 is energized and in so doing the circuit for R7 is broken at R8b. At the same time a holding circuit is established with R8a and the coil points R8c provide a circuit to the spindle clutch. Simultaneously, of course, the points d, e and f are closed, providing current to the spindle motor in a reverse pattern, thereby causing it to rotate in a direction to drive the spindles back up into their normal molding position. Upon the completion of the spindle up action, the spindle up limit switch 227 is mechanically opened, thereby breaking the circuit for relay R8 and re-establishing the ready to act condition of the spindle down mechanism.

Because of the spindle up limit switch 217, which is closed only when the spindles are up, indexing cannot take place until the spindles are in this position. Even if two operators were running the machine, therefore, the person observing the molding station could not start indexing until the spindles at the emptying station 35 were returned to their up position.

Although only four molds are shown and described herein, it is apparent that any number of molds could be employed. Cooling molds do not tie up any expensive or massive equipment and are completely independent with their integral mechanical locks. Hence, if molding requires 30 seconds and cooling one minute, a four mold device as shown will do. If an object to be molded requires two minutes to cool but only 30 seconds to mold, then six molds will be required to provide four 30 second molding periods at cooling before a mold is moved to the removal station. Obviously this machine is adapted to any molding interval and full extruder capacity can be used.

It is apparent that many modifications and variations of this invention as hereinbefore set forth may be made without departing from the spirit and scope thereof. The specific embodiments described are given by way of example only and the invention is limited only by the terms of the appended claims.

What is claimed is:

1. A molding machine including a rotatable frame, a plurality of molds secured to the rotatable frame, a parison extruding means, means for indexing said frame to place the molds consecutively under said parison extruding means, the improvement comprising, each of said molds consisting of a central sleeve portion closed on its sides and opened at its ends, movable closure members for closing the ends of said sleeve during the molding operation, and securing means for locking said movable closure members to said sleeve against axial movement with respect to each other, said securing means including flanges on said sleeve and annular grooves in said closure members which interact with said flanges when said closure members are closed on said sleeve.

2. The structure of claim 1 in which said sleeve flanges are tapered and tapered flange face engaging means adjustably secured within the groove of said closure members.

3. A molding machine of the general type having a rotating indexable frame, a plurality of molds mounted on said frame, a raw material extruding device near said frame, means for indexing said molds consecutively to said raw material extruding device, the improvement comprising, each of said molds being an open ended one piece cylindrical sleeve, pairs of semi-circular end closure lids pivotally secured to said sleeve and pivoting from opposite sides to form closures over the ends thereof, powered lid closing means secured to said frame near said raw materials extruding device, mechanical locks on said closure lids, power means near said raw material extruding device for actuating said mechanical locks, a pair of laterally and vertically movable male mold members, an opening in one of said end closures to receive said male mold members, means for moving said male mold members vertically and laterally, said means for moving said male mold members laterally consisting of a reciprocating motor one portion of which is secured to one of said male mold members and the other portion of which is secured to the other of said male mold members, a track secured to said mold end and said male mold members slidably mounted on said track, and stops for determining the ultimate position of each of said male mold members at both of their two positions on said track.

4. The structure of claim 3 in which said means for vertically moving said male mold members consists of an elongated gear, said movable male mold members being threaded into blocks mounted on said slide, a driven gear on one of said male mold members, a pair of sprockets aligned with each other one on each of said male mold members, a chain reeved over said sprockets, shoe means secured to said blocks and surrounding a portion of each of said sprockets to prevent said chain from disengaging from said sprockets when said blocks are moved toward each other, said elongated gear and said driven gear being in engagement with each other, and means for driving said elongated gear in opposite directions alternately.

5. The structure of claim 4 in which said elongated gear and said driven gear has the usual cycloid curve on one side thereof and are slanted on the other side thereof whereby the gear teeth at their outer ends are substantially pointed viewed in plan.

6. A mold for a blow-molding machine comprising: a unitary sleeve member, at least two separable parts overlying said sleeve during the molding operation and defining a cover, means for moving the separable parts close together to form a complete mold, mechanical locking structure on said separable parts co-operating to hold them close together when so placed, and securing means for locking said separable parts to said sleeve against axial movement with respect to each other during said molding operation, said securing means consisting of flanges on said sleeve, and said separable parts having annular grooves which are movably associated with said sleeve to embrace said flanges.

7. The mold of claim 6 in which said sleeve defines the central portion of said mold, said sleeve flanges are tapered and tapered flange face engaging means adjustably secured within the grooves of said separable members.

8. In a mold for a blow-molding machine comprising: a frame, a unitary open-ended cylindrical sleeve member mounted on said frame, movable end closure members mounted on said sleeve for closing the ends of said sleeve during a molding operation and opening the ends of said sleeve in a non-molding condition, means supported by said frame for closing said members, said members carrying locking means for retaining said members in the closed position, a pair of laterally and vertically movable male mold members, an opening in one of said end closures to receive said male mold members, means for moving said male mold members vertically and laterally, said means for moving said male mold members laterally consists of a reciprocating motor one portion of which is secured to one of said male mold members and the other portion of which is secured to the other of said male mold members, a track secured to said mold end and said male mold members slidably mounted on said track, and stops for determining the ultimate position of each of said male mold members at both of their two positions on said track, said means for vertically moving said male mold members consists of an elongated gear, said movable male mold members being threaded into blocks mounted on a slide, a driven gear on one of said male mold members, a pair of sprockets aligned with each other one on each of said male mold members, a chain reeved over said sprockets, shoe means secured to said blocks and surrounding a portion of each of said sprockets when said blocks are moved toward each other, said elongated gear and said driven gear being in engagement with each other, and means for driving said elongated gear in opposite directions alternately.

9. The structure of claim 8 in which said elongated gear and said driven gear has the usual cycloid curve on one side thereof and are slanted on the other side thereof whereby the gear teeth at their outer ends are substantially pointed viewed in plan.

10. A molding machine of the general type having a rotating indexable frame, a plurality of molds mounted on said frame, a raw material extruding device near said frame, means for indexing said molds consecutively to said raw material extruding device, the improvement comprising, each of said molds being an open ended one piece cylindrical sleeve, pairs of semi-circular end closure lids pivotally secured to said sleeve and pivoting from opposite sides to form closures over the ends thereof, powered lid closing means secured to said frame near said raw materials extruding device, mechanical locks on said closure lids, power means near said raw material extruding device for actuating said mechanical locks, a plurality of rail brace members, means connecting said members to said frame so that the members lie under the arc of the outer ends of said lid halves as they swing under the influence of said lid closure means, and wheel means adjustably secured to said lid halves and engaging said rail brace members to support the outer ends of said lid halves as they are closed.

11. A molding machine of the general type having a rotating indexable frame, a plurality of molds mounted on said frame, a raw material extruding device near said frame, means for indexing said molds consecutively to said raw material extruding device, the improvement comprising, each of said molds being an open ended one piece cylindrical sleeve, pairs of semi-circular end closure lids pivotally secured to said sleeve and pivoting from opposite sides to form closures over the ends thereof, powered lid closing means secured to said frame near said raw materials extruding device, mechanical locks on said closure lids, power means near said raw material extruding device for actuating said mechanical locks, said power means consisting of a pair of partial gears pivoted to said frame and engaged with each other, a lever arm extending from one of said partial gears, a reciprocating motor secured to said frame and said lever arm to pivot said gears, and shoulders formed on portions of said partial gears that pivot toward each other when said lever is moved in one direction by said reciprocating motor for engaging said mechanical locks on said closure lids.

12. A molding machine of the general type having a rotating indexable frame, a plurality of molds mounted on said frame, a raw material extruding device near said frame, means for indexing said molds consecutively to said raw material extruding device, the improvement comprising, each of said molds being an open ended one piece cylindrical sleeve, pairs of semi-circular end closure lids pivotally secured to said sleeve and pivoting from opposite sides to form closures over the ends thereof, powered lid closing means secured to said frame near said raw materials extruding device, mechanical locks on said closure lids, power means near said raw material extruding device for actuating said mechanical locks, a pair of laterally and vertically movable male mold members, an opening in one of said end closures to receive said mold members, means for moving said male mold members vertically and laterally, said means for vertically moving said male mold members consists of an elongated gear, said movable male mold members being threaded into blocks mounted on a slide, a driven gear on one of said male mold members, a pair of sprockets aligned with each other one on each of said male mold members, a chain reeved over said sprockets, shoe means secured to said blocks and surrounding a portion of each of said sprockets when said blocks are moved toward each other, said elongated gear and said driven gear being in engagement with each other, and means for driving said elongated gear in opposite directions alternately.

13. In a mold for a blow-molding machine comprising: a frame, a unitary open-ended cylindrical sleeve member mounted on said frame, movable end closure members mounted on said sleeve for closing the ends of said sleeve during a molding operation and opening the ends of said sleeve in a non-molding condition, means supported by said frame for closing said members, said members carrying locking means for retaining said members in a closed position, said frame includes rail brace members lying under the arc of the outer ends of said closure members as they swing under the influence of said closure means, and wheel means adjustably secured to said closure members and engaging said rail brace members to support the outer ends of said closure members as they are closed.

14. In a mold for a blow-molding machine comprising: a frame, a unitary open-ended cylindrical sleeve member mounted on said frame, movable end closure members mounted on said sleeve for closing the ends of said sleeve during a molding operation and opening the ends of said sleeve in a non-molding condition, means supported by said frame for closing said members, said members carrying locking means for retaining said members in the closed position, and means for actuating said locking means, said actuating means consisting of a pair of partial gears pivoted to said frame and engaged with each other, a lever arm extending from one of said partial gears, a reciprocating motor secured to said frame and said lever arm to pivot said gears, and lid lock engaging shoulders formed on portions of said partial gears that pivot toward each other when said lever is moved in one direction by said reciprocating motor.

15. In a mold for a blow-molding machine comprising: a frame, a unitary open-ended cylindrical sleeve member mounted on said frame, movable end closure members mounted on said sleeve for closing the ends of said sleeve during a molding operation and opening the ends of said sleeve in a non-molding condition, means supported by said frame for closing said members, said members carrying locking means for retaining said members in the closed position, a pair of laterally and vertically movable male mold members, an opening in one of said end closures to receive said male mold members, means for moving said male mold members vertically and laterally, said means for vertically moving said male mold members consists of an elongated gear, said movable male mold members being threaded into blocks mounted on a slide, a driven gear on one of said male mold members, a pair of sprockets aligned with each other one on each of said male mold members, a chain reeved over said sprockets, shoe means secured to said blocks and surrounding a portion of each of said sprockets to prevent said chain from disengaging from said sprockets when said blocks are moved toward each other, said elongated gear and said driven gear being in engagement with each other, and means for driving said elongated gear in opposite directions alternately.

16. A mold for a blow-molding machine comprising: a unitary sleeve member, at least two separable parts overlying said sleeve during the molding operation and defining a cover, means for moving the separable parts close together to form a complete mold, mechanical locking structure on said separable parts co-operating to hold them close together when so placed, and securing means for locking said separable parts to said sleeve against axial movement with respect to each other during said molding operation, said securing means including a flange member and a groove member, and said sleeve carrying of the members with said separable parts carrying the other of said members.

References Cited by the Examiner

UNITED STATES PATENTS

| | | | |
|---|---|---|---|
| 2,230,190 | 1/41 | Ferngren | 18—5 |
| 2,349,177 | 5/44 | Kopitke | 18—5 |
| 2,681,472 | 6/54 | Rempel | 18—26 |
| 2,715,751 | 8/55 | Weber | 18—5 |
| 2,784,452 | 3/57 | Ruekberg et al. | 18—5 |
| 2,810,160 | 10/57 | Bottleman | 18—42 |
| 2,834,986 | 5/58 | Bailey et al. | 18—26 |
| 2,858,564 | 11/58 | Sherman et al. | 18—5 |
| 2,914,799 | 12/59 | Canfield | 18—5 |
| 2,938,402 | 5/60 | Willmore | 74—424.8 |
| 2,951,390 | 9/60 | Martens et al. | 74—424.8 |
| 2,989,776 | 6/61 | Strong | 18—5 X |
| 3,020,595 | 2/62 | Szajna | 18—42 |
| 3,100,317 | 8/63 | Perry | 18—5 |
| 3,124,857 | 3/64 | Delisle | 18—43 |

FOREIGN PATENTS

| | | |
|---|---|---|
| 1,104,304 | 9/55 | France. |
| 1,151,917 | 7/63 | Germany. |

J. SPENCER OVERHOLSER, *Primary Examiner.*

MICHAEL V. BRINDISI, WILLIAM J. STEPHENSON,
*Examiners.*